United States Patent
Bertolino et al.

(10) Patent No.: US 12,353,584 B2
(45) Date of Patent: Jul. 8, 2025

(54) REAL-TIME SERVICING OF VERIFICATION QUERIES USING HYBRID DATA SOURCES

(71) Applicant: EQUIFAX INC., Atlanta, GA (US)

(72) Inventors: Juan Martin Bertolino, Chesterfield, MO (US); Sankar Rao Penumacha, Ballwin, MO (US)

(73) Assignee: EQUIFAX INC., Atlanta, GA (US)

( * ) Notice: Subject to any disclaimer, the term of this patent is extended or adjusted under 35 U.S.C. 154(b) by 283 days.

(21) Appl. No.: 18/047,615

(22) Filed: Oct. 18, 2022

(65) Prior Publication Data
US 2024/0126912 A1    Apr. 18, 2024

(51) Int. Cl.
*G06F 21/62*    (2013.01)
*H04L 9/40*    (2022.01)

(52) U.S. Cl.
CPC ........ *G06F 21/6227* (2013.01); *H04L 63/102* (2013.01); *H04L 63/126* (2013.01)

(58) Field of Classification Search
CPC .. G06F 21/6227; H04L 63/102; H04L 63/126
See application file for complete search history.

(56) References Cited

U.S. PATENT DOCUMENTS

| | | | |
|---|---|---|---|
| 2015/0370728 A1* | 12/2015 | Yamada | G06F 12/1009 711/163 |
| 2022/0027810 A1* | 1/2022 | Murthy | G06Q 10/0635 |
| 2023/0016839 A1* | 1/2023 | Malboubi | H04L 41/0895 |

FOREIGN PATENT DOCUMENTS

| | | | | |
|---|---|---|---|---|
| WO | WO-2023057955 A1 * | 4/2023 | | G06F 11/0754 |

* cited by examiner

*Primary Examiner* — Mohammad W Reza
(74) *Attorney, Agent, or Firm* — Kilpatrick Townsend & Stockton LLP

(57) ABSTRACT

In some aspects, a verification system can receive a verification query from a verifier computing system for requesting verification of characteristics of an entity involved in an online interaction. The verification query can include a unique identifier ("UID") of the entity. The verification computing system can query a verification repository in the verification computing system based on the UID. Additionally, the verification computing system can query an external-source cache using the UID. In response to determine a match for the UID in the external-source cache, the verification computing system can request external sensitive data records for the entity from an external source corresponding to the external-source cache. Generating consolidated sensitive data records can involve consolidating the external sensitive data records and internal sensitive data records obtained through querying the verification repository. A verification result, generated using the consolidated sensitive data records, can be transmitted to the verifier computing system.

17 Claims, 7 Drawing Sheets

REAL-TIME SERVICING OF VERIFICATION QUERIES USING HYBRID DATA SOURCES

TECHNICAL FIELD

This disclosure relates generally to computer-implemented methods and systems for real-time servicing of verification queries for entities based on sensitive data stored in hybrid data sources.

BACKGROUND

Various types of sensitive data, such as user records, are often required for completing electronic transactions. However, the sensitive data are often stored in a secured manner to prevent unauthorized access. In addition, it is not always clear where the sensitive data can be obtained. This delays or even prevents the electronic transactions to be completed.

Furthermore, the sensitive data stored in an online data repository can change frequently. For example, data describing various attributes of an individual may rapidly become inaccurate due to changes in that individual's circumstances (e.g., income level, employment, address, etc.). Maintaining the accuracy of data describing these changes can be hindered by access control requirements. For instance, online access to certain types of data may be strictly controlled due to the sensitive the data, which increases the effort required to maintain a repository of accurate, sensitive data. If online services rely on the accuracy of this data, these inaccuracies hinder the prompt completion of electronic transactions between computing systems, which results in sub-optimal allocation of resources. This misallocation can include, for example, wasted computing resources for incomplete transactions, lost opportunity for consumers and businesses, delays in providing access to certain online features, etc.

SUMMARY

Various embodiments of this disclosure provide systems and methods for real-time servicing of verification queries based on sensitive data stored in hybrid data sources. In one example, a method that includes one or more processing devices performs operations comprising: receiving, by a verification computing system from a verifier computing system, a verification query requesting verification of characteristics of an entity involved in an online interaction, the verification query comprising a unique identifier of the entity; querying a verification repository internal to the verification computing system based on the unique identifier of the entity; querying an external-source cache using the unique identifier of the entity; in response to determining that there is a match for the unique identifier of the entity in the external-source cache, requesting external sensitive data records for the entity from an external source corresponding to the external-source cache; consolidating the external sensitive data records and internal sensitive data records obtained through querying the verification repository to generate consolidated sensitive data records; and transmitting a verification result generated based on the consolidated sensitive data records to the verifier computing system.

In another example, a system comprises a processing device; and a memory device in which instructions executable by the processing device are stored for causing the processing device to perform operations. The operations comprise: receiving, by a verification computing system from a verifier computing system, a verification query requesting verification of characteristics of an entity involved in an online interaction, the verification query comprising a unique identifier of the entity; querying a verification repository internal to the verification computing system based on the unique identifier of the entity; querying an external-source cache using the unique identifier of the entity; in response to determining that there is a match for the unique identifier of the entity in the external-source cache, requesting external sensitive data records for the entity from an external source corresponding to the external-source cache; consolidating the external sensitive data records and internal sensitive data records obtained through querying the verification repository to generate consolidated sensitive data records; and transmitting a verification result generated based on the consolidated sensitive data records to the verifier computing system.

A non-transitory computer-readable storage medium has program code that is executable by a processor device to cause a computing device to perform operations. The operations comprise: receiving, by a verification computing system from a verifier computing system, a verification query requesting verification of characteristics of an entity involved in an online interaction, the verification query comprising a unique identifier of the entity; querying a verification repository internal to the verification computing system based on the unique identifier of the entity; querying an external-source cache using the unique identifier of the entity; in response to determining that there is a match for the unique identifier of the entity in the external-source cache, requesting external sensitive data records for the entity from an external source corresponding to the external-source cache; consolidating the external sensitive data records and internal sensitive data records obtained through querying the verification repository to generate consolidated sensitive data records; and transmitting a verification result generated based on the consolidated sensitive data records to the verifier computing system.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

Features, aspects, and advantages of this disclosure are better understood when the following Detailed Description is read with reference to the accompanying drawings.

DETAILED DESCRIPTION

Figure 1:
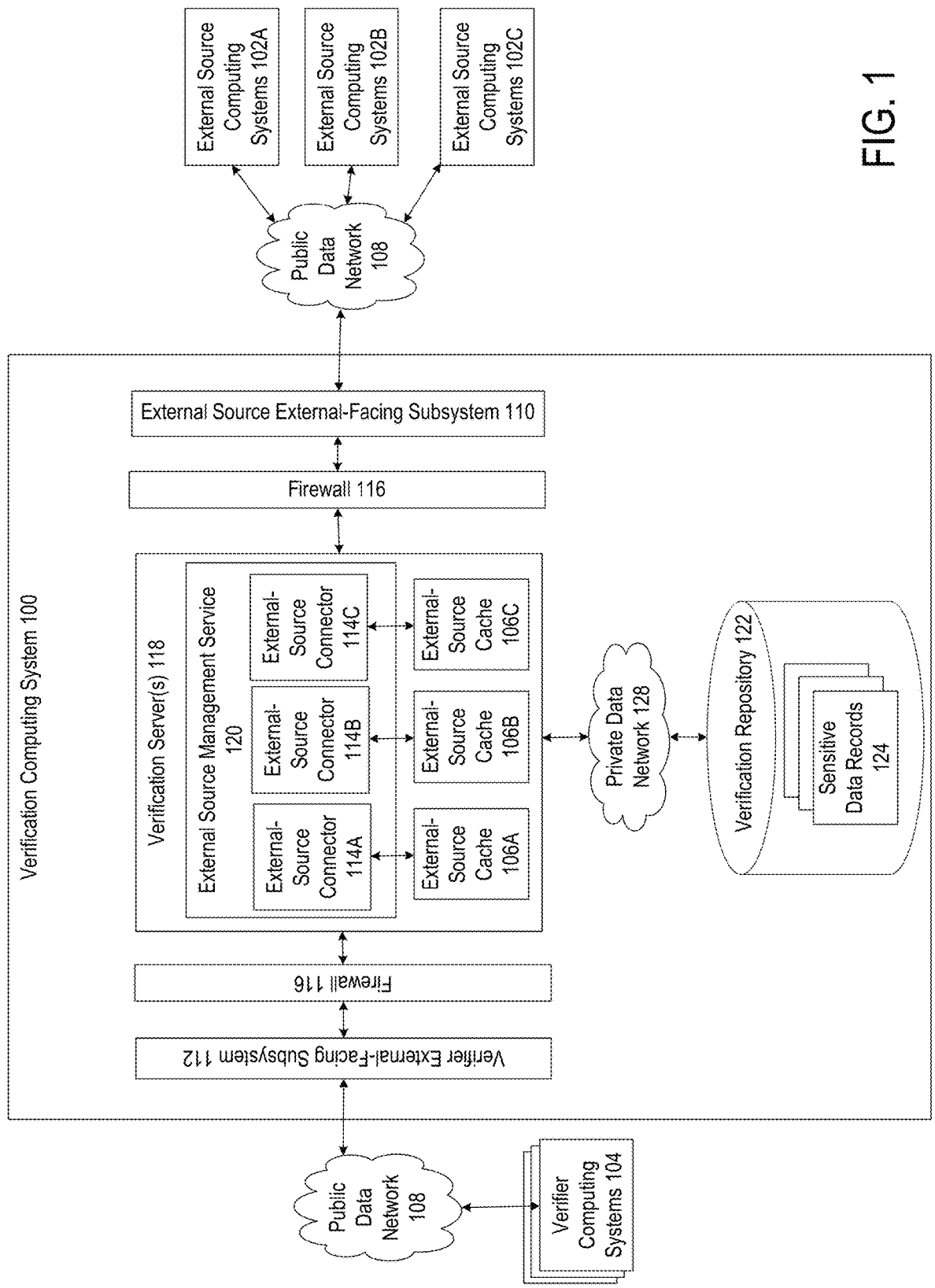
FIG. 1 is a block diagram depicting an example of an operating environment in which a verification computing system services verification queries in real-time using data from hybrid data sources, according to certain aspects of this disclosure.

Certain aspects and features of this disclosure involve real-time servicing of verification queries from hybrid data sources while maintaining required access control procedures for the sensitive data used for responding to these queries. For example, a verification computing system can maintain a verification repository containing standardized sensitive data obtained by processing data periodically provided by contributor systems of sensitive data through secure communication channels with these contributor systems (e.g., computing systems operated by employers, human resource systems, insurance companies, etc.). In some aspects, the verification repository can be referred to as an "internal verification repository". These contributor systems can be associated with contributors that are allowed to and capable of providing and frequently updating sensitive data to the verification computing system.

However, some potential contributor systems may not be allowed to share sensitive data of an entity without a specific request for this entity. In other examples, some potential contributor systems are not equipped with the capability of frequently reformatting and providing a large amount of sensitive data securely to the verification computing system. As a result, these potential contributor systems cannot provide the sensitive data stored thereupon to the verification computing system for standardization and servicing the verification queries as discussed above. Yet, disregarding data stored in these potential contributor systems can cause verification results to be incomplete or inaccuracy.

To address the above issues, the verification computing system can be configured to service the verification queries using hybrid data sources, that is, the verification repository internal to the verification computing system and data stored on those potential contributor systems (referred to herein as "external data sources" or "external sources"). In order to utilize the data stored in the external data sources, the verification computing system can further maintain an external-source cache for each external data source. The external-source cache can be configured to store a secured cache file (e.g., a hashed file) containing an indication (e.g., the unique identifiers) of sensitive data records available at the external source. The external source can provide an updated cache file periodically to the verification computing system so that the verification computing system has the latest version of the available sensitive data on the external source.

Using the internal verification repository and the external-source caches, the verification computing system can service, in real time, verification queries from third-party systems, referred to as "verifier computing systems." Examples of verification queries include requests by vendor systems and other verifier systems to verify one or more characteristics of an entity (e.g., a user, an organization, a device, etc.) involved in an online interaction, such as an electronic transaction. The verification queries can include a unique identifier of the entity to be verified. Based on the unique identifier, the verification computing system can service the verification queries by querying the internal verification repository and the external data sources to determine if there are data available for verifying the entity.

Querying the internal verification repository can include searching the sensitive data records stored in the internal verification repository for a match of the unique identifier contained in the verification query. If a match is found, the corresponding sensitive data record is retrieved for verification. Querying the external data sources can include identifying the external data sources that can be used to service the verification query. For example, certain external data sources have rules or policies to prevent the sensitive data stored thereupon from servicing the verification queries from a certain verifier computing system or a certain type of verifier computing system. In that case, the verification computing system can first identify the verifier computing system or the type of the verifier computing system and determine the external data sources that can be used to service queries from the verifier computing system.

For each of the external data sources that can be used to service the verification query, the verification computing system can search the corresponding external-source cache using the unique identifier of the entity. As discussed above, the external-source cache may be a secured cache file, such as storing a hash of each unique identifier of data record available on the corresponding external source. In that case, the verification computing system can also generate a hash of the unique identifier specified in the verification query and search for a match of the hashed identifier in the external-source cache. If a match is found, the verification computing system can request the additional data in the sensitive data record of the entity from the corresponding external data source for verification.

If a matching sensitive data record is found in the internal verification repository but not in the external data sources, the matching sensitive data record in the internal verification repository is used to generate the verification results. Likewise, if a matching sensitive data record is found in an external data source but not in the internal verification repository, the matching sensitive data record received from the external data source is used to generate the verification results. If a matching sensitive data record is found in both the internal verification repository and the external data sources, the sensitive data records from both types of sources are consolidated before generating the verification results. The consolidation can include, for example, removing duplicate data from these data records, resolving conflicts in these data records, or combining these data records. In some examples, the consolidation can also include selecting data from one source over another based on a priority associated with the date sources (including both the internal and external data sources).

Based on the retrieved sensitive data records, the verification computing system can verify the characteristics of the entity as specified in the verification query, generate the verification results, and transmit a response to the verifier computing system that includes the verification results. Servicing the verification queries in real time can facilitate prompt completion of online interactions, such as electronic transactions, between the verifier computing systems and computing systems associated with the verified entities.

Certain aspects described herein provide improvements to the accuracy of online searching or verification techniques while maintaining the security of the sensitive data. For instance, the hybrid-source-based verification presented here allows both internal and external data sources to be used for searching and verification, thereby increasing the scope of the search. As a result, the accuracy of the searching and verification can be increased. In addition, the sensitive data records stored in the external data sources are only provided when a match is found in the external-source cache and only the matched data records are provided. Further, the external-resource cache provided to the verification computing system only contained a secured version of the sensitive data identifier which does not reveal the plaintext of the identifiers. Therefore, the security of the sensitive data records of the external sources are maintained, allowing these sensitive data records to be utilized to servicing the search and verification queries.

Certain aspects described herein also provide improvements to online searching and verification by solving problems that are specific to online platforms. For an online platform where computing systems are interacting with each other during electronic transactions, the searching and verification must be performed in real-time or near real-time, such as a couple of seconds or even shorter. In some scenarios, a verifier computing system may request the verification for a large number of entities at once and multiple verifier computing systems may submit the verification requests at the same time, which add additional challenges to this task. The hybrid-source-based verification presented here addresses these challenges. Because the external-source caches only contain identifiers of the sensitive data records, the size of the external-source caches is small and the searching in the external-source caches can be performed quickly (e.g., in milliseconds). The subsequent retrieval of the data records is limited to only the matched data records whose size is significantly smaller than the entire data records stored on the external sources. Therefore, the network bandwidth consumption and the time needed for transmitting the matched data records from the external sources to the verification computing system are significantly lower than transmitting the entire data records stored on the external sources. This allows the verification queries to be serviced in real time or near real time.

These illustrative examples are given to introduce the reader to the general subject matter discussed here and are not intended to limit the scope of the disclosed concepts. The following sections describe various features and examples with reference to the drawings, in which like numerals indicate like elements, but, like the illustrative examples, should not be used to limit this disclosure.

Operating Environment Example for Verification Exchange Service

Referring now to the drawings, FIG. 1 is a block diagram depicting an example of an operating environment in which an external source management service 120 manages a verification repository 122 and uses the verification repository 122 to service verification queries from verifier computing systems 104. In some aspects, the verification repository 122 can be referred to as an internal verification repository. FIG. 1 depicts examples of hardware components of a verification computing system 100, according to some aspects. The verification computing system 100 is a specialized computing system that may be used for processing large amounts of data using a large number of computer processing cycles. In some examples, the verification computing system 100 can be a verification exchange computing system.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. More components, fewer components, or a different arrangement of the components shown in FIG. 1 may be included in other examples. Any suitable arrangement of the depicted components is contemplated herein.

The verification computing system 100 can communicate with one or more client systems. Client systems can include verifier computing systems 104, entity computing systems, external source computing systems 102, or some combination thereof. The entity computing systems can include user computing systems that are associated with a user. For example, client systems may send data to the verification server 118 to be processed or may send signals to the verification server 118 that control or otherwise influence different aspects of the verification computing system 100 or the data it is processing. The client systems may interact, via one or more public data networks 108, with various external-facing subsystems of the verification computing system 100 (e.g., a contributor external-facing subsystem, a consumer external-facing subsystem, a verifier external-facing subsystem 112, and an external source external-facing subsystem 110). Each external-facing subsystem includes one or more computing devices that provide a physical or logical sub-network (sometimes referred to as a "demilitarized zone" or a "perimeter network") that expose certain online functions of the verification computing system 100 to an untrusted network, such as the Internet or another public data network 108. Each external-facing subsystem is communicatively coupled, via a firewall device 116, to one or more computing devices forming a private data network 128. The firewall device 116, which can include one or more devices, creates a secured part of the verification computing system 100 that includes various devices in communication via the private data network 128. In some aspects, by using the private data network 128, the verification computing system 100 can house the verification repository 122 in an isolated network (i.e., the private data network 128) that has no direct accessibility via the Internet or another public data network 108. The client systems may also interact with one another via one or more public data networks 108 to facilitate online interactions (e.g., online transactions) between users of the entity computing systems and online services provided by the verifier computing systems 104.

Each external source computing system 102 may include one or more third-party devices, such as individual servers or groups of servers operating in a distributed manner. An external source computing system 102 can include any computing device or group of computing devices operated by an employer, a payroll system, a human-resource management system, an insurance provider system, a healthcare provider system, a government data-provider system, etc. The external source computing system 102 can include one or more server devices. The one or more server devices can include or can otherwise access one or more non-transitory computer-readable media. The external source computing system 102 can also execute an online service. The online service can include executable instructions stored in one or more non-transitory computer-readable media. The external source computing system 102 can further include one or more processing devices that are capable of storing, formatting, and transmitting income data, employment data, or both to the verification computing system 100. The external source computing system 102 can be associated with an external data source.

Each verifier computing system 104 may include one or more third-party devices, such as individual servers or groups of servers operating in a distributed manner. A verifier computing system 104 can include any computing device or group of computing devices operated by a seller, lender, or other provider of products or services. The verifier computing system 104 can include one or more server devices. The one or more server devices can include or can otherwise access one or more non-transitory computer-readable media. The verifier computing system 104 can also execute an online service. The online service can include executable instructions stored in one or more non-transitory computer-readable media. The verifier computing system 104 can further include one or more processing devices that are capable of executing the online service to perform operations described herein. In some aspects, the online service can provide an interface (e.g., a website, web server, or other server) to facilitate electronic transaction involving a user of a user computing system or an entity computing system used to accessing the online service provided by the verifier computing system 104. The online service may transmit data to and receive data from the user computing systems or the entity computing systems to enable a transaction.

Each communication within the verification computing system 100 (e.g., between external source computing systems 102 and the verification computing system 100, between external source computing systems 102 and the verifier computing systems 104, between verifier computing systems 104 and the verification computing system 100, etc.) may occur over one or more data networks, such as a public data network 108, a private data network 128, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface (e.g., IEEE 802.11 or Bluetooth) or a combination of wireless interfaces. A wired network may include a wired interface (e.g., Ethernet, USB, IEEE 1394, or a fiber optic interface). The wired or wireless networks may be implemented using routers, access points, bridges, gateways, or the like, to connect devices in the data network.

A data network may include network computers, sensors, databases, or other devices that may transmit or otherwise provide data to verification computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The verification computing system 100 can include one or more verification servers 118. The verification server 118 may be a specialized computer or other machine that processes the data received within the verification computing system 100. The verification server 118 may include one or more other systems. For example, the verification server 118 may include a database system for accessing the network-attached storage unit, a communications grid, or both. A communications grid may be a grid-based computing system for processing large amounts of data.

In some aspects, the verification server 118 can allow the verification computing system 100 to be an interface between various external source computing systems 102 and various verifier computing systems 104. This architecture can facilitate the real-time provision of user information, which is received from the external source computing systems 102, to the verifier computing systems 104. The verifier computing systems 104 can engage in online interactions with entity computing systems or user computing systems. This provision of information facilitates completion of online interactions in real time (e.g., during an electronic transaction between the verifier computing system 104 and an entity computing system). The verification computing system 100 can communicate with the client systems in a manner that is out of band with respect to the external source computing systems 102, the verifier computing systems 104, the entity computing systems, or a combination thereof. For example, the communications between the verification computing system 100 and an external source computing system 102 can be performed via a separate communication channel, session, or both as compared to the communication channel or session established between the verification computing system 100 and a verifier computing system 104.

For example, the verification server 118 can include one or more processing devices that execute program code, such as a verification exchange service or an external source management service 120. The program code is stored on a non-transitory computer-readable medium. The processing devices can execute one or more processes for standardizing disparate sets of sensitive verification data, such as employment and income verification data, received from contributor computing systems (not shown in FIG. 1). A contributor computing system can include any computing device or group of computing devices operated by an employer, a payroll system, a human-resource management system, an insurance provider system, a healthcare provider system, a government data-provider system, etc. The contributor computing systems have the capability to provide sensitive verification data to the verification server 118 on a regular basis and/or are allowed to share the sensitive data with the verification server 118 in bulk.

The standardized sensitive verification data can be stored in a verification repository 122 as a set of sensitive data records 124. The set of sensitive data records 124 can include income data records and employment data records. The processing devices can also execute one or more processes that facilitate online interactions, such as electronic transactions, between entity computing systems and verifier computing systems 104 by, for example, servicing income or employment verification queries received from the verifier computing systems 104 in real time. The sensitive data records 124 are structured in a format that facilitates retrieval of large subsets of the sensitive data records 124 during thousands or millions of sessions among the verifier computing systems 104 and the entity computing systems.

As discussed above, some potential contributor systems may not be allowed to share sensitive data of an entity without a specific request for this entity or are not equipped with the capability of frequently reformatting and providing a large amount of sensitive data securely to the verification computing system. To obtain data from these potential contributor systems, the verification server 118 can include the external source management service 120 which contains one or more external-source connectors 114A-114C (which may be referred to herein individually as an external-source connector 114 or collectively as the external-source connectors 114) associated with respective external source computing systems 102A-102C. The external-source connectors 114 can be communicatively coupled to a respective external-source cache 106. For example, a first external source computing system 102A can correspond to a first external-source connector 114A in the external source management service 120. The first external-source connector 114A can communicatively couple the external source management service 120 to a first external-source cache 106A. In some aspects, the external-source connector 114 can provide functionalities such as providing APIs to the corresponding external source 102 so allow the external source 102 to provide data or otherwise transmit information (such as the sensitive data, secure keys for encrypt and decrypt the sensitive data or the cache file or other sensitive or secure data) to the verification servers. The external-source connector 114 may also be configured to call APIs provided by the external source 102 or provide data or information to the corresponding external source 102. In some aspects, the processing devices can include one or more modules, such as a web server module, a web services module, or an enterprise services module, which individually or in combination facilitate electronic transactions. For example, a web server module can be executed by a suitable processing device to provide one or more web pages or other interfaces to a contributor computing system, an external source computing system 102, a verifier computing system 104, or an entity computing system. The web pages or other interfaces can include content provided by the web services module. The web services module can generate this content by executing one or more algorithms using information retrieved from one or more of the sensitive data records 124. The enterprise services module can be executed to retrieve the information from one or more of the sensitive data records 124.

The verification computing system 100 may also include one or more network-attached storage units on which various repositories, databases, or other structures are stored. Examples of these data structures are the verification repository 122 and the authorization database. Network-attached storage unit may store a variety of different types of data organized in a variety of different ways and from a variety of different sources. For example, the network-attached storage unit may include storage other than primary storage located within verification server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The verification repository 122 can store the sensitive data records 124, such as income data records and the employment data records. The income data records, the employment data records, or both can be received by a verification server 118 via a data network, generated by the verification server 118 based on communications with client computing systems, or some combination thereof. The sensitive data records 124 can be stored in, for example, a database or other suitable data source. Suitable data sources can include, for example, secure and credentialed databases or other data structures managed by or otherwise accessible by the external source management service 120.

The sensitive data records 124 can include entity identification data. The entity identification data can include any information that can be used to uniquely identify an individual or other entity. In some aspects, entity identification data can include information that can be used on its own to identify an individual or an entity. Non-limiting examples of such entity identification data include one or more of a legal name, a company name, a social insurance number, a credit card number, a date of birth, an e-mail address, etc. In other aspects, entity identification data can include information that can be used in combination with other information to identify an individual or entity. Non-limiting examples of such entity identification data include a street address or other geographical location, employment data, etc. The entity identification data can include a data network identifier that can be used to uniquely identify a computing device (e.g., a mobile device) using the data network. In some aspects, the data network identifier can include information (e.g., an Internet Protocol (IP) address) that can be used on its own to identify a computing device. For example, an entity can be associated with a computing device that can be identified using the IP address for the computing device. In other aspects, the data network identifier can include information that can be used in combination with other information to identify a computing device.

The verification repository 122 can further include authorization credentials and authorizations. Each authorization credential can include information that can be used to uniquely identify a verifier computing system 104 from which a verification query is received or the entity associated with the verifier computing system 104. Each authorization can include information that identifies certain verification operations that can be performed on behalf of a verifier by the verification computing system 100. For example, an authorization can indicate whether a verifier has suitable qualifications to handle the sensitive data records 124 in accordance with legal or regulatory requirements, whether a verifier computing system 104 implements suitable security protocols for enforcing compliance with legal or regulatory requirements, etc.

In some aspects, the verification query can be associated with a verification of employment, a verification of income, or a social service verification. The verification of employment can include verifying employment for a user by examining employment information, such as employee job title, division, employer, work location, or the like. The verification of income can include verifying employment and income for a user by using the employment information in addition to income information, such as regular income, irregular income (e.g., commissions, overtime, etc.), pay frequency, year-to-date values, or the like. The social service verification can be a superset of the verification of income and the verification of employment that includes paycheck information with respect to pay period details.

An entity computing system can include any computing device or other communication device operated by a consumer, a buyer, or other entity. The entity computing system can include one or more entity computing systems. The entity computing system can include executable instructions stored in one or more non-transitory computer-readable media. The entity computing system can also include one or more processing devices that are capable of executing the entity computing system to perform operations described herein. In some aspects, the entity computing system can allow an entity to engage in mobile commerce with a verifier computing system 104. For instance, the user or another entity accessing the entity computing system can use the entity computing system to engage in an electronic transaction with a verifier computing system 104 via an online service.

In some aspects, the verification computing system 100 can implement one or more procedures to secure communications between the verification computing system 100 and other client systems. Non-limiting examples of features provided to protect data and transmissions between the verification computing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Figure 2:
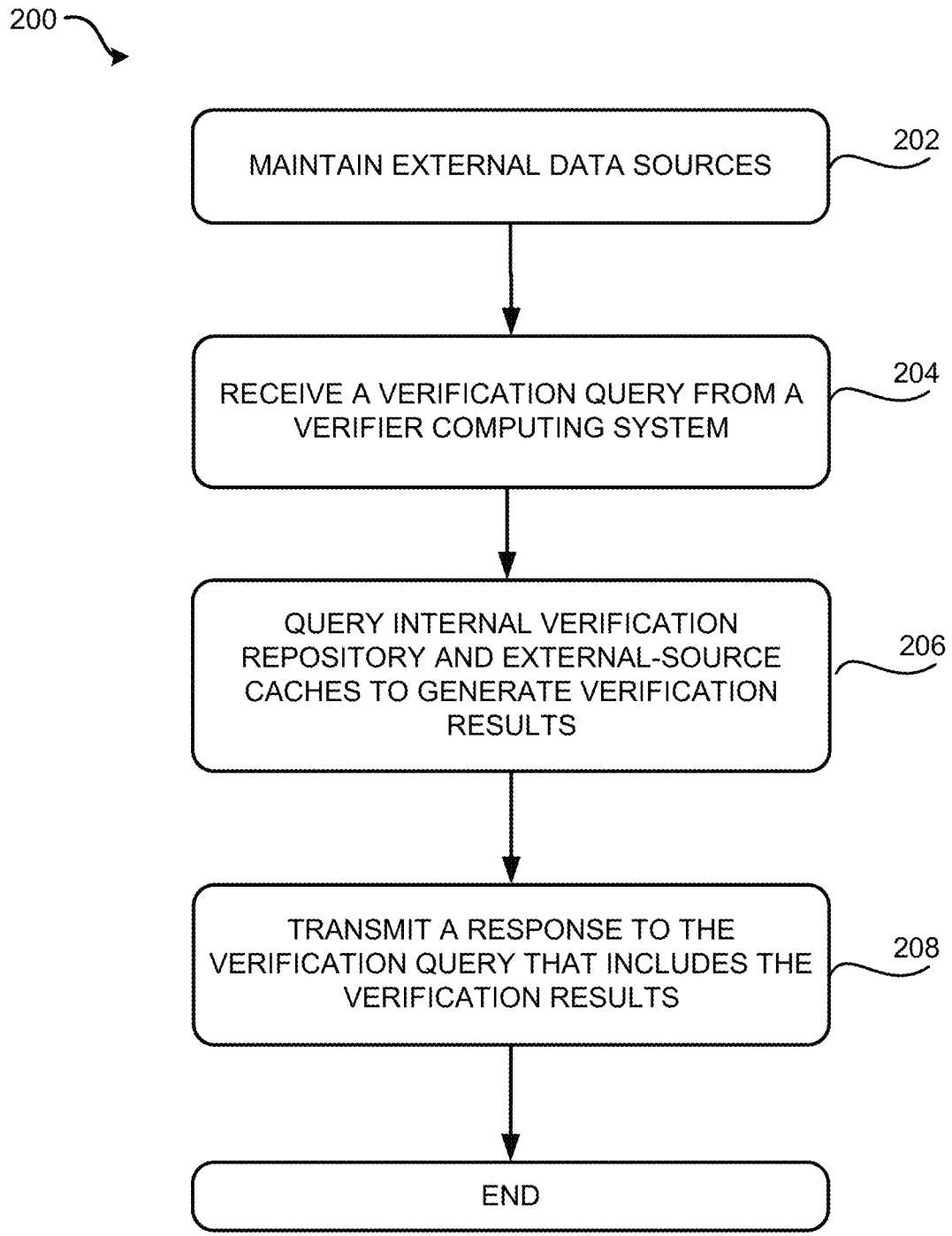
FIG. 2 is a flow chart depicting an example of a process for real-time servicing verification queries submitted by a verifier computing system involved in an electronic transaction using hybrid data sources, according to certain aspects of this disclosure.

FIG. 2 is a flow chart depicting an example of a process 200 for real-time servicing verification queries submitted by a verifier computing system 104 involved in an electronic transaction using hybrid data sources. The process 200 can involve one or more of the computing devices depicted in FIG. 1 and can include any examples of processes described herein, but other implementations are possible. In some aspects, the steps in FIG. 2 may be implemented in program code that is executed by one or more computing devices such as the verification server(s) 118 depicted in FIG. 1. In some aspects of this disclosure, one or more operations shown in FIG. 2 may be omitted or performed in a different order. Similarly, additional operations not shown in FIG. 2 may be performed.

At block 202, the process 200 involves maintaining external data sources, such as the external source computing systems 102, by using an external source management service 120 to update an external-source cache 106 for each external data source. The external data sources can include the external sources described above. The external data source can provide an updated cache file periodically, such as on a daily basis or more frequently, to the verification computing system 100 so that the verification computing system 100 has the latest version of the available sensitive data stored in the external source computing system 102. In some aspects, the updated cache file can be an updated secured cache file that has been encrypted for preventing unauthorized access of the updated secured cache file.

In some aspects, the external source management service 120 can use the external-source connector 114 to communicatively coupe the external source management service 120 to a respective external-source cache 106. The external-source cache 106 can be configured to store a secured cache file (e.g., a hashed file) containing an indication, such as a unique identifier ("UID") of sensitive data records available at the external data source. In some aspects, the external-source connector 114 can facilitate the communication of the secure keys used to encrypt the cache file. For example, the external-source connector 114 can exchange with the corresponding external data source the encryption key corresponding to the encryption for the secured cache file. The encryption key may be used to generate a hashed value of the query UID or to decrypt the secured cache file for reading the UID contained in the secured cache file.

At block 204, the process 200 also involves receiving a verification query requesting verification of characteristics of an entity involved in an online interaction. The verification query can be received by the verification computing system 100 from the verifier computing system 104. Examples of the verification query include requests by vendor systems and other verifier systems to verify one or more characteristics of an entity (e.g., a user, an organization, a device, etc.) involved in an online interaction. The verification queries can include a UID of the entity to be verified. Based on the UID, the verification computing system 100 can service the verification query by querying the verification repository 122 in the verification computing system and the external data sources to determine if there are data available for verifying the entity.

At block 206, the process 200 also involves querying a verification repository 122 internal to the verification computing system 100 and external-source caches 106 to generate verification results. Querying the verification repository 122 can include searching the sensitive data records 124 stored in the verification repository 122 for a match of the UID contained in the verification query. If a match is found, the corresponding sensitive data record of the sensitive data records 124 is retrieved for verification. Querying the external data sources, such as the external source computing systems 102, can include identifying the external data sources that can be used to service the verification query. For example, certain external data sources may contain policy rules to prevent the sensitive data stored in the certain external data sources from servicing the verification queries from a certain verifier computing system or a certain type of verifier computing system. As a result, the verification computing system 100 can first identify the verifier computing system 104 or the type of the verifier computing system 104 before determining the external data sources that can be used to service queries from the verifier computing system 104.

For each of the external data sources that can be used to service the verification query, the verification computing system 100 can search the corresponding external-source cache 106 using the UID of the entity. As discussed above, the external-source cache 106 may be a secured cache file, such as storing a hash of each unique identifier of data record available on the corresponding external source. In that case, the verification computing system 100 can also generate a hash of the unique identifier specified in the verification query using the same secure key and search for a match of the hashed identifier in the external-source cache 106. If a match is found, the verification computing system 100 can request the additional data in the sensitive data record of the entity from the corresponding external data source for verification.

If a matching sensitive data record is found in the verification repository 122 but not in the external data sources, the matching sensitive data record in the verification repository 122 is used to generate verification results. Likewise, if a matching sensitive data record is found in an external data source but not in the internal verification repository, the matching sensitive data record received from the external data source is used to generate the verification results. If a matching sensitive data record is found in both the verification repository 122 and the external data sources, the sensitive data records from both types of sources are consolidated to form consolidated sensitive data records before generating the verification results. The consolidation can include, for example, removing duplicate data from these sensitive data records 124, resolving conflicts in these sensitive data records 124, or combining these sensitive data records 124. In some examples, the consolidation can also include selecting data from one source over another based on a priority associated with the date sources (including both the internal and external data sources).

At block 208, the process 200 also involves transmitting a response to the verification query that includes the verification results. Examples of the verification results can include a fraud detection warning, a denial code, an approval code, or other information. For example, the verification results can be used by the verifier computing system to verify that a user is authorized to access certain databases for security purposes. The verification computing system 100 can generate the verification results using the consolidated sensitive data records.

In some examples, the verification server 118 can generate the verification results after performing one or more verification operations with respect to a portion of the stored sensitive data records 124 that matches a query parameter in the verification query. For example, the verification server 118 can verify that a computing device associated with the entity has a specified IP address. After generating the verification results, the verification computing system 100 can transmit the verification results to the verifier computing system 104. For example, the verifier external-facing subsystem 112 can transmit the verification results to the verifier computing system 104 via the secure channel over the public data network 108.

The verifier computing system 104 can use the verification results to complete a requested online interaction with an entity computing system. Completing the requested online interaction with the entity computing system can include transmitting an interaction response to the entity computing system. Examples of the interaction response include authorizing access to one or more functions performed by an online service of the verifier computing system 104, completing an online sale and providing confirmation to the entity computing system, transmitting requested data from the verifier computing system 104 to the entity computing system, etc.

Figure 3:
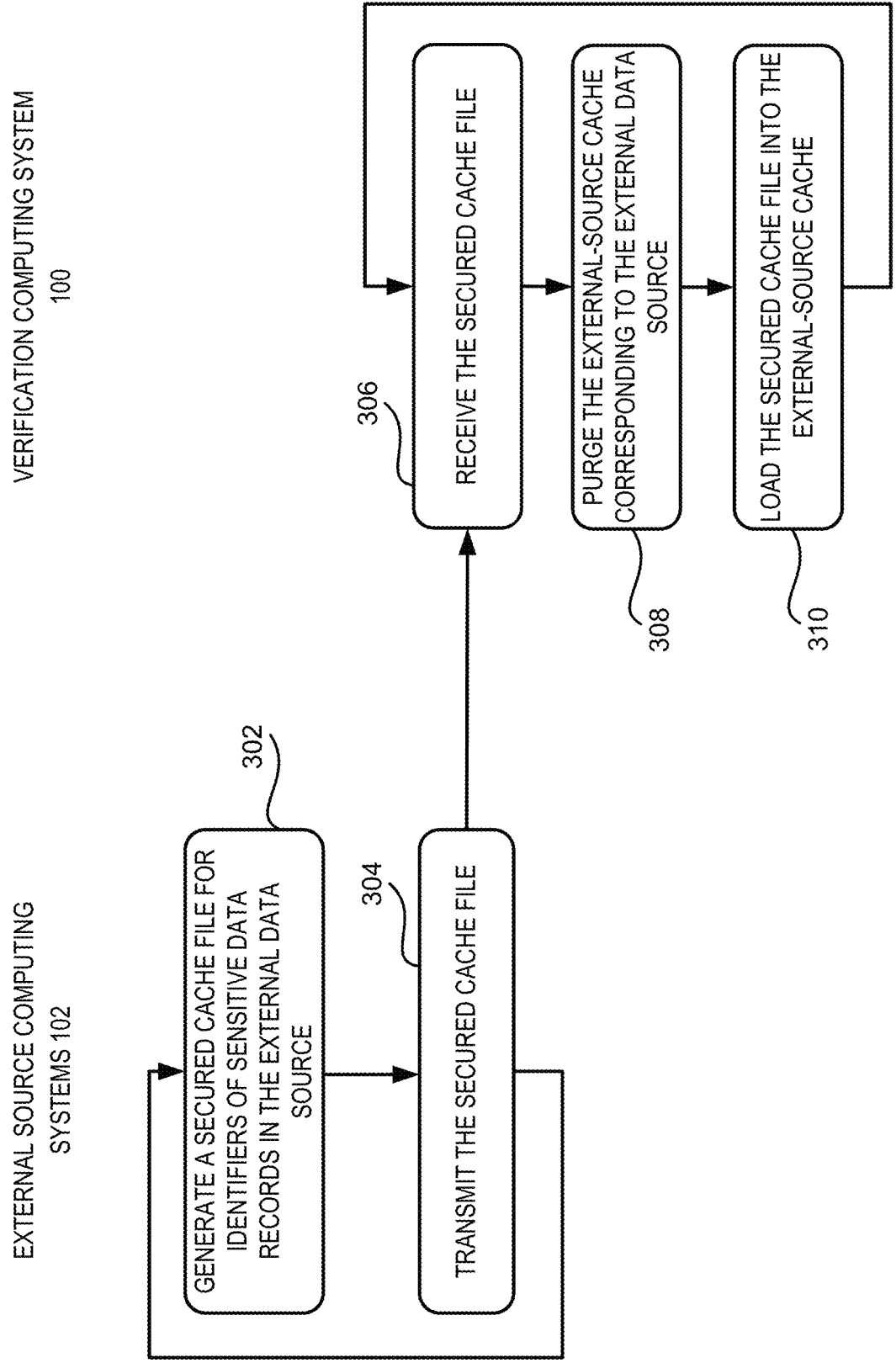
FIG. 3 is a flow chart depicting an example of a process for maintaining and updating an external-source cache, according to certain aspects of this disclosure.

FIG. 3 is a flow chart depicting an example of a process 300 for maintaining and updating an external-source cache 106 associated with an external data source, such as the external source computing system 102. In some aspects, the external data source can be referred to as an "external source" as described above. The process 300 can involve one or more of the computing devices depicted in FIG. 1 and can include any examples of processes described herein, but other implementations are possible. In some aspects, the steps in FIG. 3 may be implemented in program code that is executed by one or more computing devices such as the verification server(s) 118 depicted in FIG. 1. In some aspects of this disclosure, one or more operations shown in FIG. 3 may be omitted or performed in a different order. Similarly, additional operations not shown in FIG. 3 may be performed. The process 300 can be performed in combination with the process 200 depicted in FIG. 2.

At block 302, the process 300 involves generating a secured cache file for identifiers of sensitive data records in the external data source. The secured cache file can be encrypted to prevent unauthorized computing systems from accessing the secured cache file. One or more encryption methods can be implemented to encrypt the secured cache file. For example, the secured cache file can be hashed and additionally encrypted using a signature. In some aspects, encryption for the secured cache file can involve public key cryptography algorithms. In additional or alternative aspects, the secured cache file can be encrypted using a shared secret or other symmetric key that is specific to each external-source cache 106.

The secured cache file can be generated by the external source computing system 102 for containing the identifiers, such as a unique identifier ("UID") of the sensitive data records available at the external data source. The identifiers can uniquely identify an entity. For example, a verification computing system 100 can determine if there are data available for verifying the entity based on a unique identifier for the entity. In some aspects, the secured cache file can be secured by storing a hash of each identifier of sensitive data records available on the external data source. Other methods, such as encryption, may be implemented for securing the secured cache file.

At block 304, The process 300 also involves transmitting the secured cache file. In some examples, the external source computing system 102 associated with the external data source can transmit the secured cache file to the verification computing system 100. The secured cache file may be transmitted to the verification computing system 100 using a public data network 108, such as the Internet. In additional or alternative aspects, the process 300 may loop from block 304 to block 302 for periodically transmitting the secured cache file. Looping between block 302 and block 304 can occur daily or more frequently. In some aspects, the external source computing system 102 may update the secured cache file prior to transmitting the secured cache file to the verification computing system 100. For example, the external source computing system 102 can transmit the secured cache file at a first time and a second time later than the first time such that the secured cache file includes updated identifiers when transmitted at the second time.

At block 306, The process 300 also involves receiving the secured cache file. The verification computing system 100 can receive, through the corresponding external-source connector 114, the secured cache file from the external source computing system 102 periodically, such as every day or every hour. In some examples, the secured cache file may be received by an external source external-facing subsystem 110 in the verification computing system 100 that is communicatively coupled to the public data network 108. The external source external-facing subsystem 110 can provide a subnetwork for exposing certain online functions of the verification computing system 100 to an untrusted network, such as the Internet or another public data network 108. For example, the external source external-facing subsystem 110 can interface with the external source computing system 102 to enforce access permissions that are specific to the external source computing system 102. Providing this secure point-of-interface facilitates regular updates with respect to the secured cache file from the external source computing system 102.

The process 300 also involves purging the external-source cache 106 corresponding to the external data source, as depicted at block 308. Before storing the secured cache file in the external-source cache 106, a previous secured cache file in the external-source cache 106 can be removed from the external-source cache 106 using the external source management service 120. The previous secured cache file can be a secured cache file that was loaded into the external-source cache 106 prior to receiving the secured cache file. In some aspects, the secured cache file can be an updated version of the previous secured cache file. For example, one or more of the identifiers may have been removed from the secured cache file, added to the secured cache file, replaced by a different identifier, or any combination thereof.

The process 300 also involves loading the secured cache file into the external-source cache, as depicted at block 310. After receiving the secured cache file from the external source external-facing subsystem 110, the verification server 118 can execute an external source management service 120 for loading the secured cache file into the external-source cache 106 using the corresponding external-source connector 114.

The process 300 may periodically loop through blocks 306-310 for updating the external-source cache to house a different secured cache file periodically generated by the external source computing system 102. Looping through the blocks 306-310 may occur more frequently or less frequently than looping between blocks 302-304. In some alternative aspects, looping through the blocks 306-310 can occur at a same rate as looping between blocks 302-304.

Figure 4:
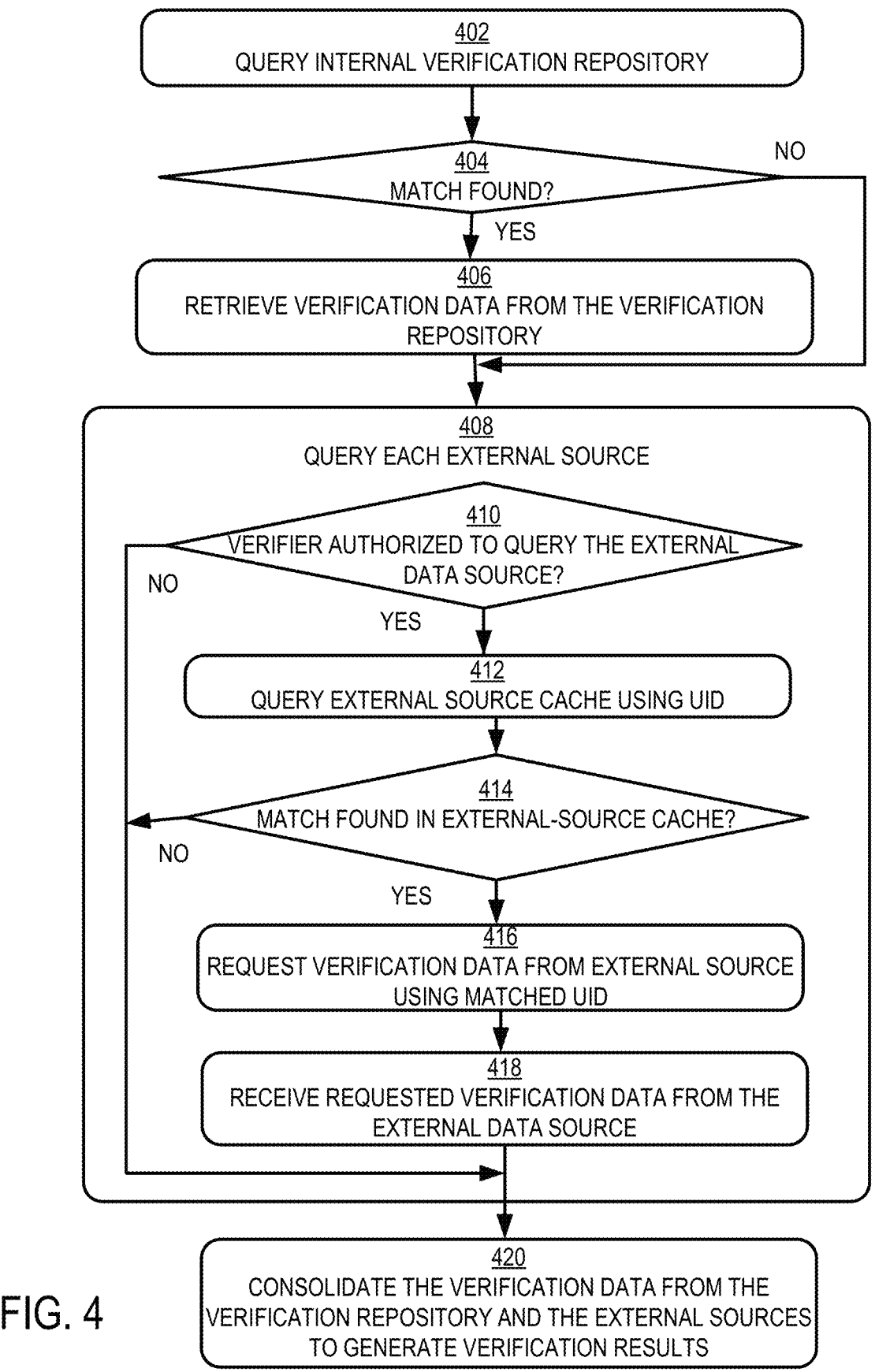
FIG. 4 is a flow chart depicting an example of a process for querying hybrid data sources for servicing a verification query submitted by a verifier computing system involved in an electronic transaction, according to certain aspects of this disclosure.

FIG. 4 is a flow chart depicting an example of a process 400 for querying hybrid data sources for servicing a verification query submitted by a verifier computing system 104 involved in an electronic transaction. The process 400 can involve one or more of the computing devices depicted in FIG. 1 and can include any examples of processes described herein, but other implementations are possible. In some aspects, the steps in FIG. 4 may be implemented in program code that is executed by one or more computing devices such as the verification server(s) 118 depicted in FIG. 1. In some aspects of this disclosure, one or more operations shown in FIG. 4 may be omitted or performed in a different order. Similarly, additional operations not shown in FIG. 4 may be performed. The process 400 can be performed in combination with the processes depicted in FIGS. 2-3.

At block 402, the process 400 involves querying a verification repository 122. The verification repository 122 can be an internal verification repository positioned in a verification computing system 100. The verification computing system 100 can service a verification query by querying the verification repository 122 based on an identifier included in the verification query. The identifier can be a unique identifier ("UID"), such as a numeric or alphanumeric string that uniquely identifies a single entity in the verification computing system 100. In additional aspects, the identifier can be an encrypted unique identifier that has been encrypted for security purposes. Encryption for the encrypted unique identifier can include hashing or implementing encryption algorithms (e.g., symmetric key algorithms or asymmetric key algorithms). In some aspects, the verification query may include more than one identifier. Examples of the verification query can include requests by a verifier computing system 104 to verify one or more characteristics such as income, employment, or other status, of an entity (e.g., an organization, a device, or the like) involved in an electronic transaction.

The process 400 also involves determining if a match is found, as depicted at block 404. In some aspects, querying the verification repository 122 can include searching sensitive data records 124 stored in the verification repository 122 for a match of the identifier(s) contained in the verification query. If a match is found, a corresponding sensitive data record can be retrieved from the verification repository 122 for verification. If a match is unavailable, the process 400 can bypass block 406.

The process 400 also involves retrieving verification data from the verification repository 122, as depicted at block 406. The corresponding sensitive data record can be retrieved by the verification server 118 from the verification repository 122 via a private data network 128.

The process 400 also involves querying each external data source, as depicted at block 408. In some aspects, more than one external data source may be queried. In additional or alternative aspects, certain external data sources have rules or policies to prevent the sensitive data records from servicing one or more verification queries from a certain verifier computing system or a certain type of verifier computing system.

The process 400 also involves determining if the verifier computing system is authorized to query the external data source, as depicted at block 410. A tag or other suitable identifier can be associated with the verifier computing system 104 for identifying the verifier computing system 104 or a type of the verifier computing system 104. The type of the verifier computing system 104 can be associated with a government, an individual, a corporation, an organization, or another suitable entity.

The process 400 also involves querying an external-source cache 106 using UID, as depicted at block 412. In some aspects, the external-source cache 106 can include an encrypted unique identifier associated with a respective sensitive data record available at the external data source. The verification computing system 100 can use the verification server 118 to query the external-source cache 106 for a match of the UID. In some aspects, more than one external-source cache can be queried. The verification server 118 can generate an encrypted query identifier associated with the unique identifier of the entity in response to querying the external-source cache 106. In some aspects, the encrypted query identifier can be encrypted using hashing.

The process 400 also involves determining if a match is found in the external-source cache 106, as depicted at block 414. Matching the UID can include searching the sensitive data records 124 in the verification repository 122 for a match of the UID. In response to finding a match of the UID, the external-source cache 106 can transmit one or more cache details to the verification computing system 100. To match the encrypted query identifier, the verification server 118 can search the external source cache 106 for an identifier corresponding to the encrypted query identifier.

The process 400 also involves requesting verification data from the external source using matched UID, as depicted at block 416. In some aspects, the verification server 118 can communicate with the external source computing system 102 using an external source external-facing subsystem 110. By requesting verification data from the external data source after determining a match of the UID, the verification computing system 100 can generate less traffic for a data network that facilitates communication between the external data source and the verification computing system 100.

The process 400 also involves receiving requested verification data from the external source, as depicted at block 418. Examples of the requested verification data can include employment verification data, income verification data, payroll verification data, device verification data, or the like. In some aspects, the requested verification data may be mutually exclusive from the verification data received from the verification repository 122. In alternative aspects, the requested verification data can have one or more data sets overlapping with the verification data received from the verification repository 122.

The process 400 also involves consolidating the verification data from the verification repository 122 and the external data sources to generate verification results, as depicted at block 420. Consolidating the verification data can include removing duplicate data or resolving conflicts before combining the verification data. Once the verification results are generated, the verification server can transmit the verification results to a verifier external-facing subsystem 112 that communicatively couples the verification computing system 100 to verifier computing systems 104. In some aspects, the verification results can be transmitted to the verifier computing systems 104 using a public data network 108.

In some aspects, consolidating the verification data can occur with respect to recentness of the verification data. Recentness of the verification data can be included as a timestamp associated with a most recent update time. For example, the verification data from the external data source can include a first timestamp that is later than a second timestamp associated with the verification data from the verification repository 122. Accordingly, the verification data from the external data source can be identified as more recently updated compared to the verification data from the verification repository 122. In response, the verification data from the external data source can be prioritized over the verification data from the verification repository 122.

Figure 5:
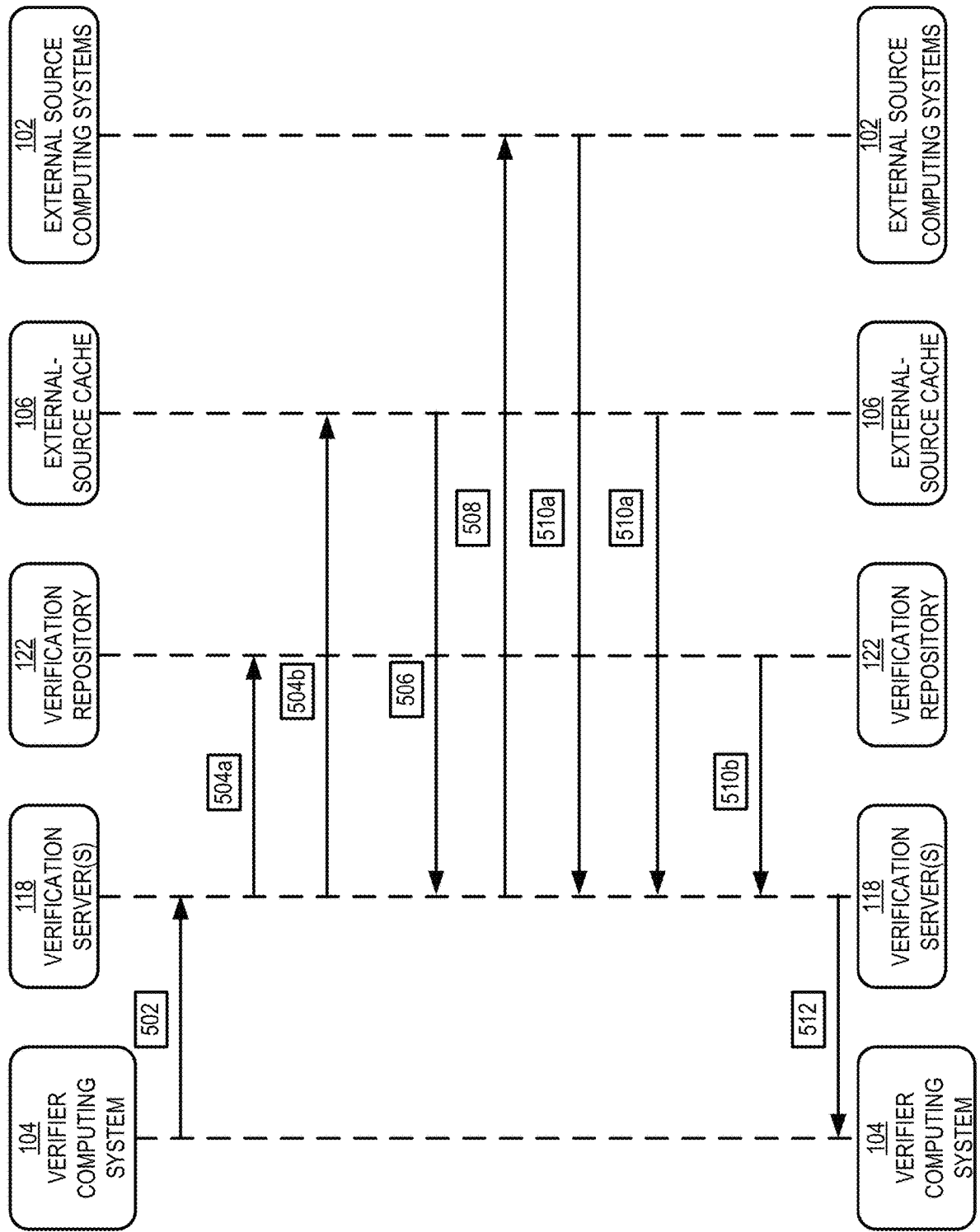
FIG. 5 is a data flow diagram depicting an example of a data flow for servicing verification queries regarding employment or income data of a user by a verifier computing system involved in an electronic transaction with a user computing system associated with the user, according to certain aspects of this disclosure.

FIG. 5 is a data flow diagram depicting an example of a data flow 500 for servicing verification queries regarding employment or income data of a user by a verifier computing system 104 involved in an electronic transaction with a user computing system associated with the user. The data flow 500 can involve one or more of the computing devices depicted in FIG. 1 and can include any examples of the processes described herein, but other implementations are possible.

In the data flow 500, a verification request 502 can be transmitted from a verifier computing system 104 to a verification server 118 in a verification computing system 100. The verification request 502 can include at least one identifier, such as a unique identifier ("UID"). After receiving the verification request 502, the verification server 118 can execute a first lookup command 504a with respect to the verification repository 122. The first lookup command 504a can involve querying the verification repository 122 to determine if a match is present in the verification repository 122 for an entity associated with the UID. In additional aspects, the verification server 118 may execute a second lookup command 504b with respect to an external-source cache 106. Executing the second lookup command 504b can involve determining a match of an encrypted query identifier in the external-source cache 106. More than one external-source cache may be queried to determine if a match for the UID is present in the external-source cache 106.

If a match for the UID is unavailable in the external-source cache 106, the external-source cache 106 may transmit a negative response to the verification server 118 to indicate a lack of the match for the UID in the external-source cache 106. If a match for the UID is present in the external-source cache 106, the verification server 118 can transmit an information request 508 to an external source computing system 102 using an external source external-facing subsystem 110. After the external source computing system 102 receives the information request 508, the external source computing system 102 can transmit a first set of verification information 510a to the verification server 118. In additional aspects, the external-source cache 106 may transmit a second set of verification information 510b stored in the verification repository 122 to the verification server 118. The external-source cache 106 additionally may transmit UID details to the verification server 118 in response to determining a match for the UID. In some aspects, the first set of verification information 510a and the second set of verification information 510b can be mutually exclusive. In alternative aspects, one or more first data sets in the first set of verification information 510a may overlap with one or more second data sets in the second set of verification information 510b. In some aspects in which the match for the UID is unavailable, the verification repository 122 can transmit the second set of verification information 510b to the verification server 118.

Before generating verification results 512, the verification server 118 can consolidate the first set of verification information 510a with the second set of verification information 510b. Consolidating the verification data 510 can include removing duplicates, flagging inconsistencies, resolving conflicts in the verification data 510, or the like. In alternative aspects, the verification server 118 may only receive the first set of verification information 510a to consolidate before generating the verification results 512. Consolidating the verification data 510 additionally can include assigning a priority level to the first set of verification information 510a and the second set of verification information 510b based on data sources. Verification data 510 with a high priority level may be selected over verification data 510 with a low priority level.

After consolidating the verification data 510, the verification server 118 can generate the verification results 512 for transmitting to the verifier computing system 104. The verifier computing system 104 can use the verification results 512 to complete an online interaction, such as an electronic transaction. For example, the verification results 512 can be used by the verifier computing system 104 to verify a credit score or an employment status for a user.

Figure 6:
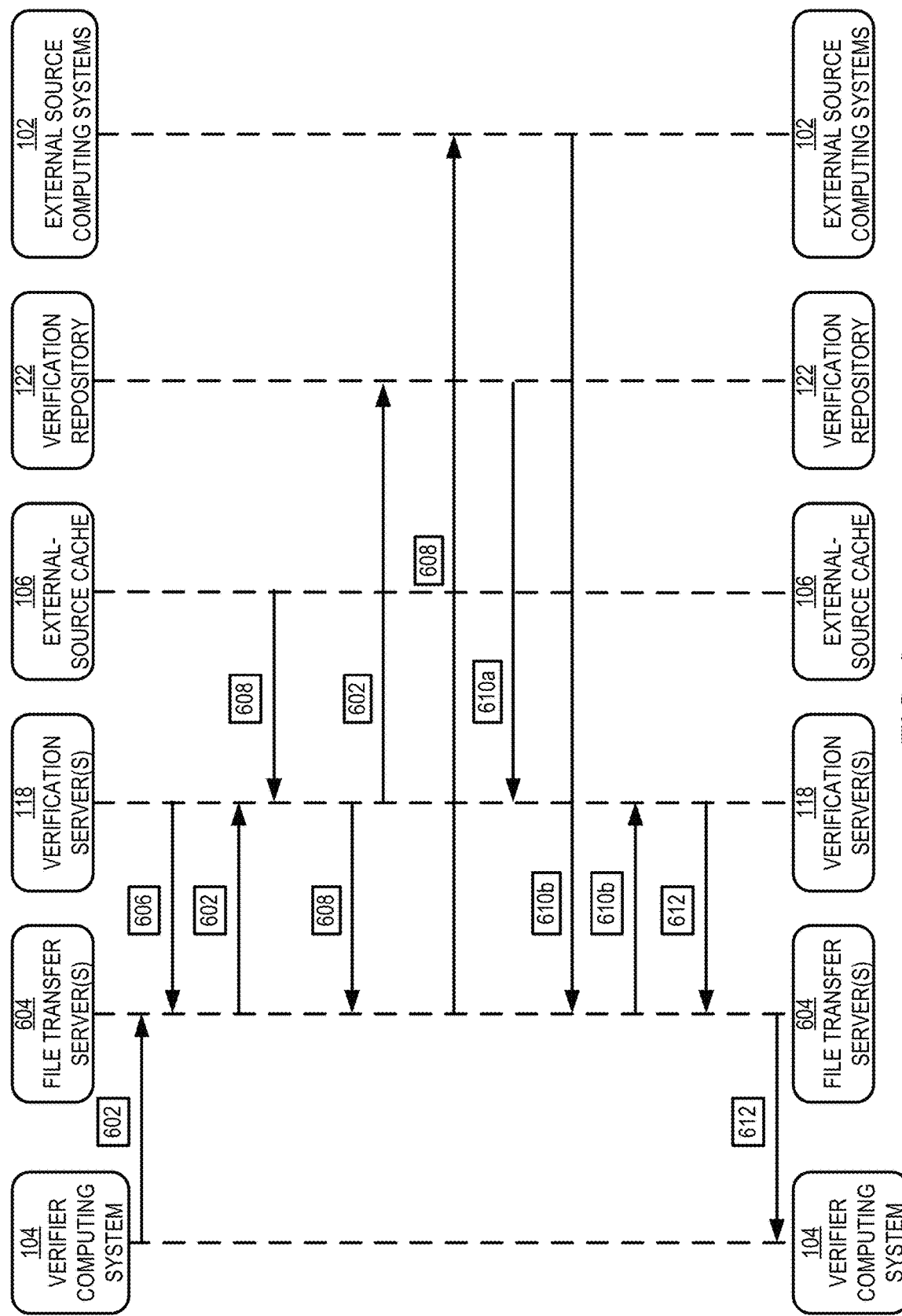
FIG. 6 is a data flow diagram depicting an example of a data flow for servicing a batch of verification queries regarding employment or income data of users by a verifier computing system involved in electronic transactions with user computing systems associated with the users, according to certain aspects of this disclosure.

FIG. 6 is a data flow diagram depicting an example of a data flow 600 for servicing a batch of verification queries regarding employment or income data of users by a verifier computing system 104 involved in electronic transactions with user computing systems associated with the users. In some aspects, verification queries can be complied into the batch file for relatively faster processing. The data flow 600 can involve one or more of the computing devices depicted in FIG. 1 and can include any examples of the processes described herein, but other implementations are possible.

In the data flow 600, a batch file 602 can be transmitted from a verifier computing system 104 to a file transfer server 604. The file transfer server 604 can be positioned in a verification computing system 100 to facilitate transferring one or more files to and from the verification computing system 100. In some aspects, the file transfer server 604 may be a combination of subsystems in the verification computing system 100, such as a verifier external-facing subsystem 112 and an external source external-facing subsystem 110. A verification server 118 in the verification computing system 100 can transmit a request 606 for the batch file 602 to the file transfer server 604. After receiving the request 606, the file transfer server 604 can transmit the batch file 602 to the verification server 118.

Based on the received batch file 602, the verification server 118 can query an external-source cache 106 for generating a filtered file 608 based on the batch file 602. Querying the external-source cache 106 can be implemented to find one or more unique identifiers ("UIDs") in the external-source caches 106 that match the entity UIDs in the batch file 602. The verification server 118 can generate encrypted query identifiers associated with the respective UIDs of the entities for searching the external-source caches 106 for a match of the encrypted query identifiers. The filtered file 608 can contain the UIDs that have a match in the external-source caches 106. The verification server 118 can transmit the filtered file 608 to the file transfer server 604 such that the file transfer server 604 can transmit the filtered file 608 to external data sources, such as external source computing systems 102, using an external source external-facing subsystem 110. The external data sources can transmit a first set of verification information 610*a* to the file transfer server 604 based on the filtered file 608.

In additional aspects, the verification server 118 can transmit the batch file 602 to a verification repository 122 for obtaining a second set of verification information 610*b* based on the batch file 602. The verification server 118 may receive the first set of verification information 610*a* from the file transfer server 604 before consolidating the first set of verification information 610*a* with the second set of verification information 610*b*. After consolidating the verification information 610, the verification server 118 can generate verification results 612 based on consolidated verification information. In some aspects, the verification server 118 can implement timeouts for an online interaction that result in discarding consolidated verification information, verification results 612, or a combination thereof. In additional aspects, circuit breakers in a verification computing system 100 may open in response to a component in the verification computing system 100 failing or timing out repeatedly.

The file transfer server 604 can receive the verification results 612 from the verification server 118 before transmitting the verification results 612 to the verifier computing system 104. In some aspects, the verification results 612 may be transmitted to more than one verifier computing system 104. After receiving the verification results 612, the verifier computing system 104 can complete an electronic transaction associated with income or employment data. For example, a current employer for a user can be verified based on the verification results 612.

Example of Computing System for Verification Service

Figure 7:
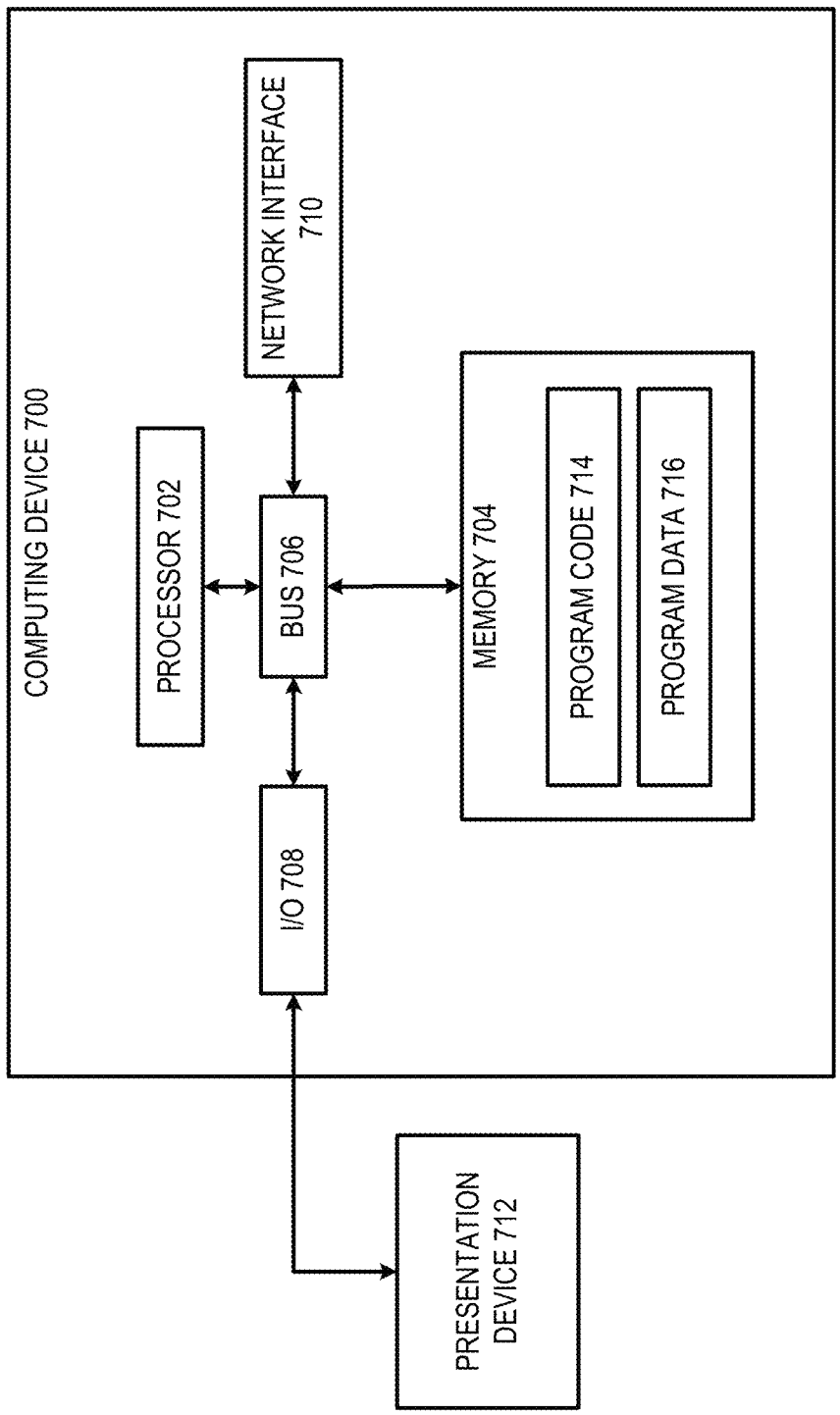
FIG. 7 is a block diagram depicting an example of a computing system suitable for implementing aspects of the techniques and technologies presented herein.

Any suitable computing system or group of computing systems can be used to perform the operations for the machine-learning operations described herein. For example, FIG. 7 is a block diagram depicting an example of a computing device 700, which can be used to implement the verification server(s) 118 described with respect to FIG. 1. The computing device 700 can include various devices for communicating with other devices in the verification computing system 100, as described with respect to FIG. 1. The computing device 700 can include various devices for performing one or more transformation operations described above with respect to FIGS. 1-6.

The computing device 700 can include a processor 702 that is communicatively coupled to a memory 704. In some aspects, the processor 702 can be referred to as a "processor device". The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 that includes the external source management service 120. The program code 714 for the external source management service 120 may be resident in any suitable computer-readable medium and may be executed on any suitable processing device. For example, as depicted in FIG. 7, the program code 714 for the external source management service 120 can reside in the memory 704 at the computing device 700 along with the program data 716 associated with the program code 714, such as the external-source cache 106. Executing the external source management service 120 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method that includes one or more processing devices performing operations comprising:
   receiving, by a verification computing system from a verifier computing system, a verification query requesting verification of characteristics of an entity involved in an online interaction, wherein the entity is a user or organization, and the verification query comprises a unique identifier of the entity;
   querying a verification repository internal to the verification computing system based on the unique identifier of the entity;
   querying an external-source cache using the unique identifier of the entity, wherein the external-source cache comprises an encrypted unique identifier of each sensitive data record available at an external source and wherein querying the external-source cache using the unique identifier of the entity comprises:
      generating an encrypted query identifier for the unique identifier of the entity; and
      searching the external-source cache for a match of the encrypted query identifier;
   in response to determining that there is a match for the unique identifier of the entity in the external-source cache, requesting external sensitive data records for the entity from the external source corresponding to the external-source cache;
   consolidating the external sensitive data records and internal sensitive data records obtained through querying the verification repository to generate consolidated sensitive data records corresponding to the entity; and
   transmitting a verification result generated based on the consolidated sensitive data records to the verifier computing system.

2. The method of claim 1, wherein the encrypted query identifier comprises a hash of the unique identifier of the entity.

3. The method of claim 1, further comprising maintaining a plurality of external-source caches comprising the external-source cache, wherein maintaining the plurality of external-source caches comprises, for each of the external-source caches:
   receiving an updated secured cache file from an external source corresponding to the external-source cache;
   purging the external-source cache; and
   loading the updated secured cache file into the external-source cache.

4. The method of claim 1, wherein consolidating the external sensitive data records and the internal sensitive data records comprises one or more of:
   removing duplicate data from the external sensitive data records and the internal sensitive data records;
   resolving conflicts in the external sensitive data records and the internal sensitive data records; or
   combining the external sensitive data records and the internal sensitive data records.

5. The method of claim 1, further comprising:
   prior to querying the external-source cache, determining that the external source corresponding to the external-source cache accepts verification requests from the verification computing system, wherein querying the external-source cache is performed in response to determining that the external source corresponding to the external-source cache accepts verification requests from the verification computing system.

6. The method of claim 1, wherein the verification query is received in a batch file comprising a plurality of verification queries.

7. A system comprising:
   a processing device; and
   a memory device in which instructions executable by the processing device are stored for causing the processing device to perform operations comprising:
   receiving, by a verification computing system from a verifier computing system, a verification query requesting verification of characteristics of an entity involved in an online interaction, wherein the entity is a user or organization, and the verification query comprises a unique identifier of the entity;
   querying a verification repository internal to the verification computing system based on the unique identifier of the entity;
   querying an external-source cache using the unique identifier of the entity, wherein the external-source cache comprises an encrypted unique identifier of each sensitive data record available at the external source and wherein querying the external-source cache using the unique identifier of the entity comprises:
   generating an encrypted query identifier for the unique identifier of the entity; and
   searching the external-source cache for a match of the encrypted query identifier;
      in response to determining that there is a match for the unique identifier of the entity in the external-source cache, requesting external sensitive data records for the entity from an external source corresponding to the external-source cache;
      consolidating the external sensitive data records and internal sensitive data records obtained through querying the verification repository to generate consolidated sensitive data records corresponding to the entity; and
      transmitting a verification result generated based on the consolidated sensitive data records to the verifier computing system.

8. The system of claim 7, wherein the encrypted query identifier comprises a hash of the unique identifier of the entity.

9. The system of claim 7, wherein the operations further comprise:
   maintaining a plurality of external-source caches comprising the external-source cache, wherein maintaining the plurality of external-source caches comprises, for each of the external-source caches:
      receiving an updated secured cache file from an external source corresponding to the external-source cache;

purging the external-source cache; and
loading the updated secured cache file into the external-source cache.

10. The system of claim 7, wherein consolidating the external sensitive data records and the internal sensitive data records comprises one or more of:
removing duplicate data from the external sensitive data records and the internal sensitive data records;
resolving conflicts in the external sensitive data records and the internal sensitive data records; or
combining the external sensitive data records and the internal sensitive data records.

11. The system of claim 7, wherein the operations further comprise:
prior to querying the external-source cache, determining that the external source corresponding to the external-source cache accepts verification requests from the verifier computing system, wherein querying the external-source cache is performed in response to determining that the external source corresponding to the external-source cache accepts verification requests from the verifier computing system.

12. The system of claim 7, wherein the verification query is received in a batch file comprising a plurality of verification queries.

13. A non-transitory computer-readable storage medium having program code that is executable by a processor device to cause a computing device to perform operations, the operations comprising:
receiving, by a verification computing system from a verifier computing system, a verification query requesting verification of characteristics of an entity involved in an online interaction, wherein the entity is a user or organization, and the verification query comprises a unique identifier of the entity;
querying a verification repository internal to the verification computing system based on the unique identifier of the entity;
querying an external-source cache using the unique identifier of the entity, wherein the external-source cache comprises an encrypted unique identifier of each sensitive data record available at the external source and wherein querying the external-source cache using the unique identifier of the entity comprises:
generating an encrypted query identifier for the unique identifier of the entity; and
searching the external-source cache for a match of the encrypted query identifier;
in response to determining that there is a match for the unique identifier of the entity in the external-source cache, requesting external sensitive data records for the entity from an external source corresponding to the external-source cache;
consolidating the external sensitive data records and internal sensitive data records obtained through querying the verification repository to generate consolidated sensitive data records corresponding to the entity; and
transmitting a verification result generated based on the consolidated sensitive data records to the verifier computing system.

14. The non-transitory computer-readable storage medium of claim 13, wherein the encrypted query identifier comprises a hash of the unique identifier of the entity.

15. The non-transitory computer-readable storage medium of claim 13, wherein the operations further comprise:
maintaining a plurality of external-source caches comprising the external-source cache, wherein maintaining the plurality of external-source caches comprises, for each of the external-source caches:
receiving an updated secured cache file from an external source corresponding to the external-source cache;
purging the external-source cache; and
loading the updated secured cache file into the external-source cache.

16. The non-transitory computer-readable storage medium of claim 13, wherein consolidating the external sensitive data records and the internal sensitive data records comprises one or more of:
removing duplicate data from the external sensitive data records and the internal sensitive data records;
resolving conflicts in the external sensitive data records and the internal sensitive data records; or
combining the external sensitive data records and the internal sensitive data records.

17. The non-transitory computer-readable storage medium of claim 13, wherein the operations further comprise:
prior to querying the external-source cache, determining that the external source corresponding to the external-source cache accepts verification requests from the verifier computing system, wherein querying the external-source cache is performed in response to determining that the external source corresponding to the external-source cache accepts verification requests from the verifier computing system.

* * * * *